US007333710B2

(12) United States Patent
Hou et al.

(10) Patent No.: US 7,333,710 B2
(45) Date of Patent: Feb. 19, 2008

(54) DISPLAY INCLUDING A LIGHT SOURCE FOR ILLUMINATING INPUT/OUTPUT TERMINALS

(75) Inventors: Yea-Jye Hou, Kaohsiung (TW); Yao-Tsung Ko, Kaohsiung Hsien (TW); Wei-Hsin Hsieh, Ping-Tung Hsien (TW); Yeuan-Ren Moh, Irvine, CA (US)

(73) Assignee: DigiMedia Technology Co., Ltd., San-Chung, Taipei Hsien (TW)

( * ) Notice: Subject to any disclaimer, the term of this patent is extended or adjusted under 35 U.S.C. 154(b) by 235 days.

(21) Appl. No.: 11/004,164

(22) Filed: Dec. 3, 2004

(65) Prior Publication Data

US 2006/0044761 A1    Mar. 2, 2006

(30) Foreign Application Priority Data

Aug. 30, 2004    (TW)    ............................. 93126024 A

(51) Int. Cl.
*G02B 6/00* (2006.01)
(52) U.S. Cl. .................... 385/147; 385/88; 362/11; 362/189; 362/201; 361/119; 361/124; 361/700; 235/462.46; 235/472.01

(58) Field of Classification Search ................ 385/88, 385/78, 147; 235/462.46, 472.01; 307/10.8; 361/124, 119, 700; 362/11, 189, 201
See application file for complete search history.

(56) References Cited

U.S. PATENT DOCUMENTS

| | | | |
|---|---|---|---|
| 6,161,941 A * | 12/2000 | Tait et al. ................... 362/249 |
| 6,247,645 B1 * | 6/2001 | Harris et al. ................ 235/454 |
| 6,417,897 B1 * | 7/2002 | Hashimoto ................... 349/65 |
| 6,457,992 B2 * | 10/2002 | Posey et al. ................ 439/490 |
| 2001/0038038 A1 * | 11/2001 | Rando et al. .......... 235/462.45 |
| 2003/0109298 A1 * | 6/2003 | Oishi et al. ..................... 463/8 |
| 2004/0183774 A1 * | 9/2004 | Manabe et al. ............. 345/102 |

* cited by examiner

*Primary Examiner*—Frank G. Font
*Assistant Examiner*—James P. Hughes
(74) *Attorney, Agent, or Firm*—DLA Piper US LLP

(57) ABSTRACT

A display includes a casing, a terminal module, and a light source. The terminal module is mounted on an exterior of the casing, and includes a terminal unit. The light source is mounted on the casing and the terminal module, and serves to illuminate the terminal unit of the terminal module.

2 Claims, 5 Drawing Sheets

DISPLAY INCLUDING A LIGHT SOURCE FOR ILLUMINATING INPUT/OUTPUT TERMINALS

CROSS-REFERENCE TO RELATED APPLICATION

This application claims priority of Taiwanese application no. 093126024, filed on Aug. 30, 2004.

BACKGROUND OF THE INVENTION

1. Field of the Invention

The invention relates to display, more particularly to a display that includes a light source for illuminating input/output terminals.

2. Description of the Related Art

A conventional display, such as a liquid crystal display or a plasma display, includes a viewing screen, and a plurality of input/output terminals that are disposed at a rear side of the display. Moreover, the rear side of the display is printed with indicia, each of which is disposed adjacent to and identifies a respective one of the input/output terminals.

The conventional display is disadvantageous in that the display is typically placed such that the rear side thereof faces against a wall. As such, the input/output terminals and the indicia may not be reachable by light, thereby affecting visibility of the input/output terminals and the indicia. This causes inconvenience on the part of the user when performing connections.

SUMMARY OF THE INVENTION

Therefore, the object of the present invention is to provide a display that is capable of overcoming the aforesaid drawback of the prior art.

According to the present invention, a display comprises a casing, a terminal module, and a light source. The terminal module is mounted on an exterior of the casing, and includes a terminal unit. The light source is mounted on one of the casing and the terminal module, and serves to illuminate the terminal unit of the terminal module.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
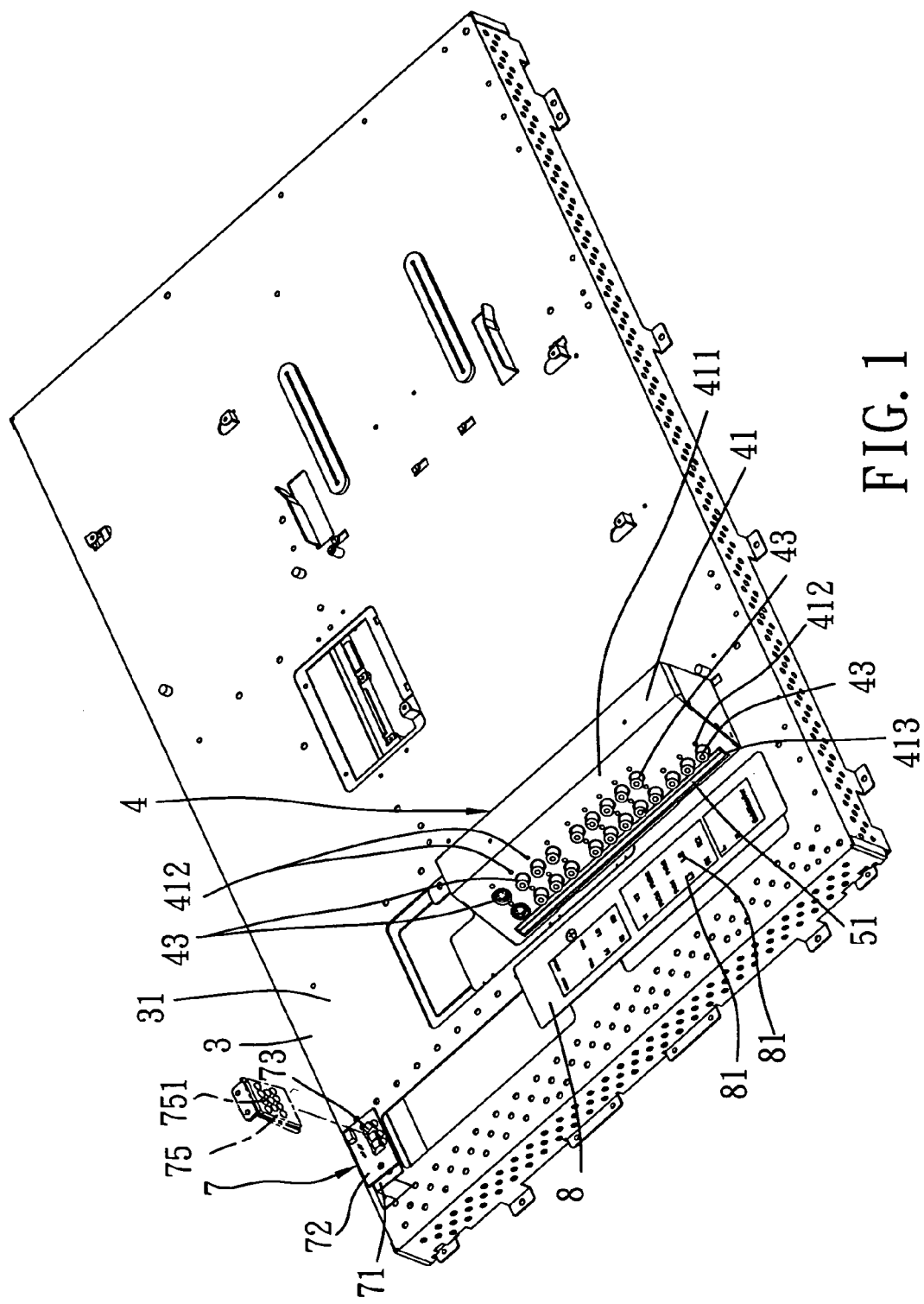
FIG. 1 is a perspective view of the preferred embodiment of a display according to the present invention.
Figure 2:
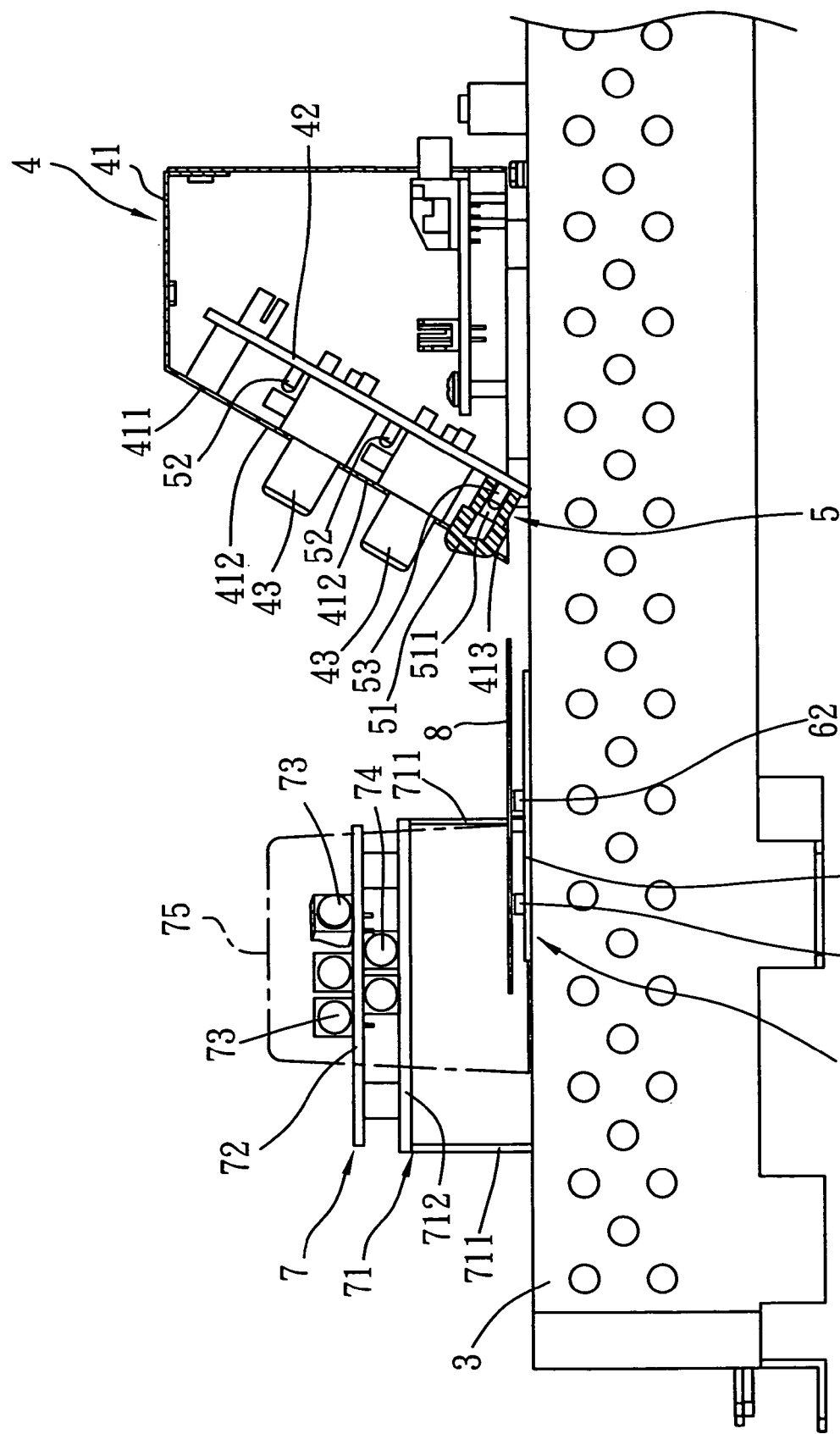
FIG. 2 is a fragmentary sectional view of the preferred embodiment illustrating a light source and a terminal module.
Figure 3:
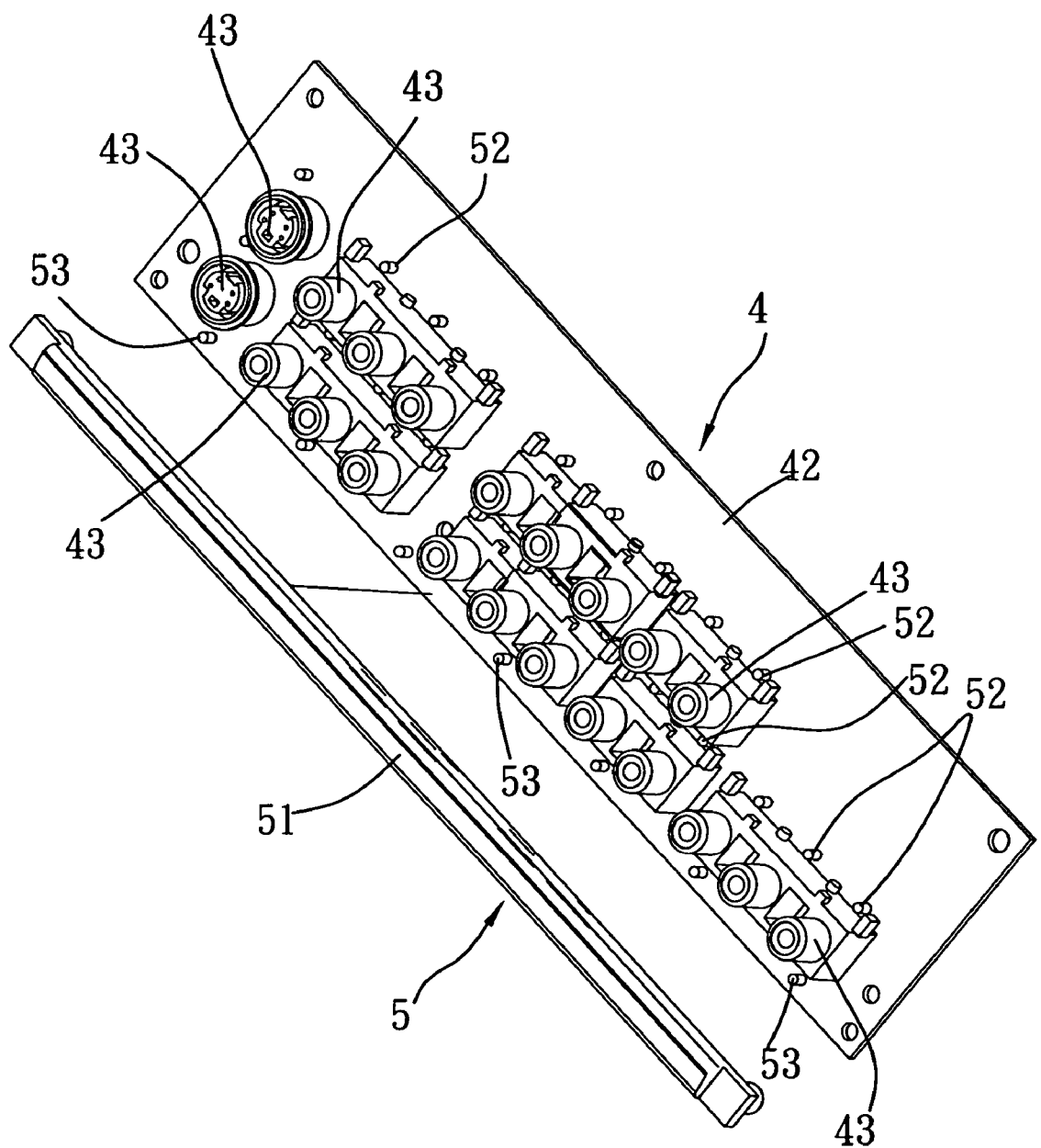
FIG. 3 is a perspective view of the preferred embodiment illustrating a first light-emitting unit of the light source and a terminal unit of the terminal module.

Referring to FIGS. 1 to 3, the preferred embodiment of a display according to this invention is shown to include a casing 3, a terminal module 4, and a light source.

The display further includes a viewing screen (not shown) that displays video images, in a known manner. In this embodiment, the display may be a liquid crystal display or a plasma display.

The casing 3 includes a casing wall 31 that serves to cover a rear side of the viewing screen. In this embodiment, the casing 3 is made from metal.

The terminal module 4 is mounted on an exterior of the casing wall 31 of the casing 3, and includes a hollow mounting seat 41, a main circuit board 42, and a terminal unit. The mounting seat 41 of the terminal module 4 is mounted on the casing wall 31 of the casing 3, and includes an inclined wall 411 that extends inclinedly relative to the casing wall 31 of the casing 3. The main circuit board 42 of the terminal module 4 is disposed in the mounting seat 41 of the terminal module 4, and is parallel to and is mounted to the inclined wall 411 of the mounting seat 41 of the terminal module 4.

The terminal unit of the terminal module 4 is mounted on the main circuit board 42 of the terminal module 4, and includes a plurality of input/output terminals 43, each of which extends through the inclined wall 411 of the mounting seat 41 of the terminal module 4. The input/output terminals 43 of the terminal unit of the terminal module 4 are arranged in two rows.

The light source serves to illuminate the input/output terminals 43 of the terminal unit of the terminal module 4, in a manner that will be described hereinafter.

The inclined wall 411 of the mounting seat 41 of the terminal module 4 is formed with a plurality of apertures 412, each of which is disposed adjacent to a respective one of the input/output terminals 43 of the terminal unit of the terminal module 4. The light source includes a first light-emitting unit 5 mounted on the main circuit board 42 of the terminal module 4. The first light-emitting unit 5 includes a first set of lamps 52, each of which is registered with a respective one of the apertures 412 in the inclined wall 411 of the mounting seat 41 of the terminal module 4. Each of the lamps 52 of the first light-emitting unit 5 radiates light through the respective one of the apertures 412 in the inclined wall 411 of the mounting seat 41 of the terminal module 4.

The inclined wall 411 of the mounting seat 41 of the terminal module 4 is further formed with an elongated hole 413 therethrough. The first light-emitting unit 5 of the light source further includes an elongated light transmissible shell 51 and a second set of lamps 53. The light transmissible shell 51 of the first light-emitting unit 5 is mounted on the main circuit board 42 of the terminal module 4, extends through the hole 413 in the inclined wall 411 of the mounting seat 41 of the terminal module 4, and defines a lamp recess 511. Each of the lamps 53 of the first light-emitting unit 5 extends into the lamp recess 511 in the light transmissible shell 51 of the first light-emitting unit 5, and radiates light through the light transmissible shell 51 of the first light-emitting unit 5. Preferably, each of the lamps 52, 53 of the first light-emitting unit 5 is a light-emitting diode.

Figure 4:
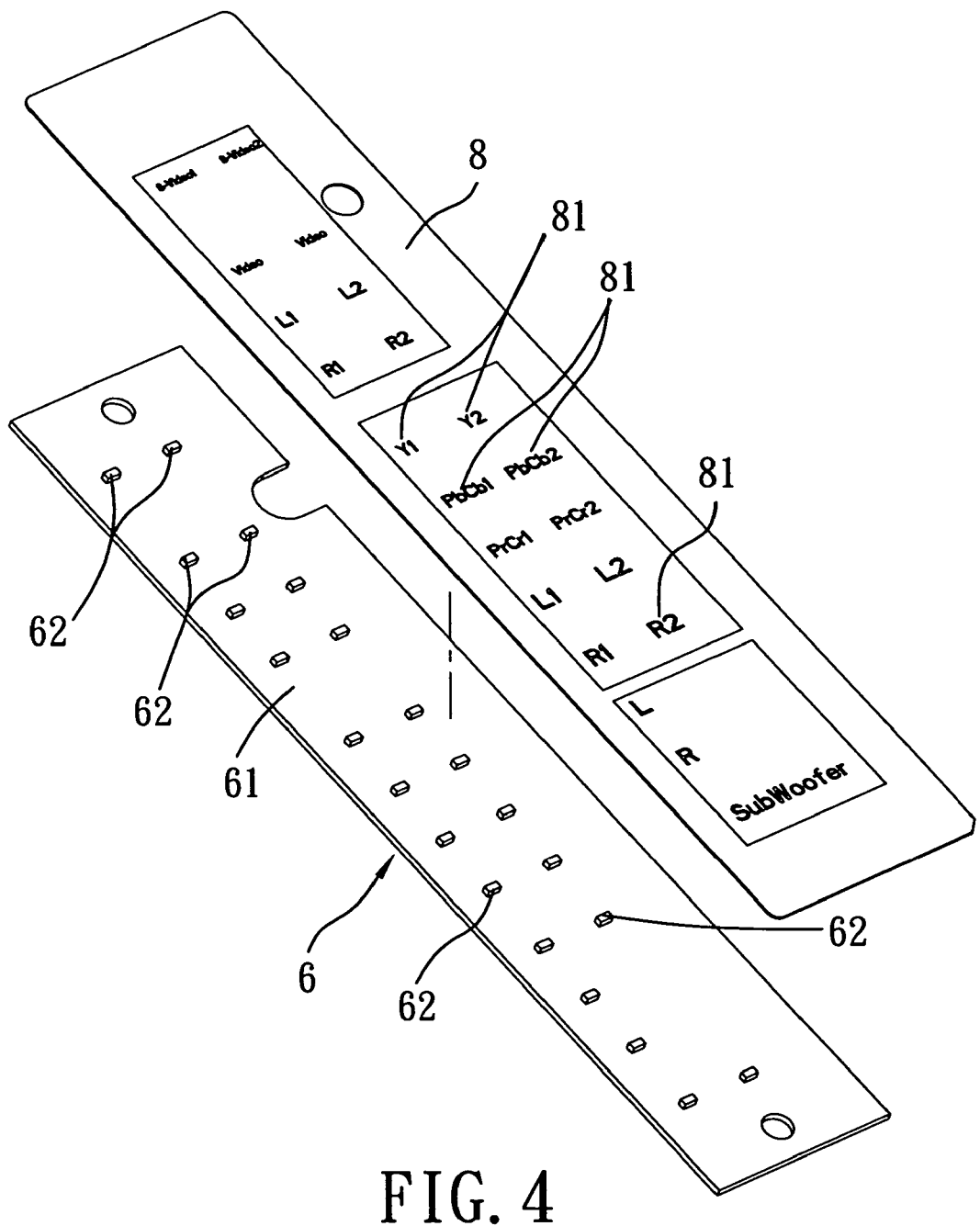
FIG. 4 is a perspective view of the preferred embodiment illustrating a second light-emitting unit of the light source.

With further reference to FIG. 4, the display further includes a transparent tag 8 disposed in front of the inclined wall 411 of the mounting seat 41 of the terminal module 4, mounted on the casing wall 31 of the casing 3, and printed with a plurality of indicia 81, each of which identifies a respective one of the input/output terminals 43 of the terminal unit of the terminal module 4.

The light source further includes a second light-emitting unit 6 that is covered by the tag 8, and that includes an auxiliary circuit board 61 and a plurality of lamps 62. The auxiliary circuit board 61 of the second light-emitting unit 6 is mounted on the casing wall 31 of the casing 3. The lamps 62 of the second light-emitting unit 6 are mounted on the auxiliary circuit board 61 of the second light-emitting unit 6 and are disposed between the tag 8 and the auxiliary circuit board 61 of the second light-emitting unit 6.

Figure 5:
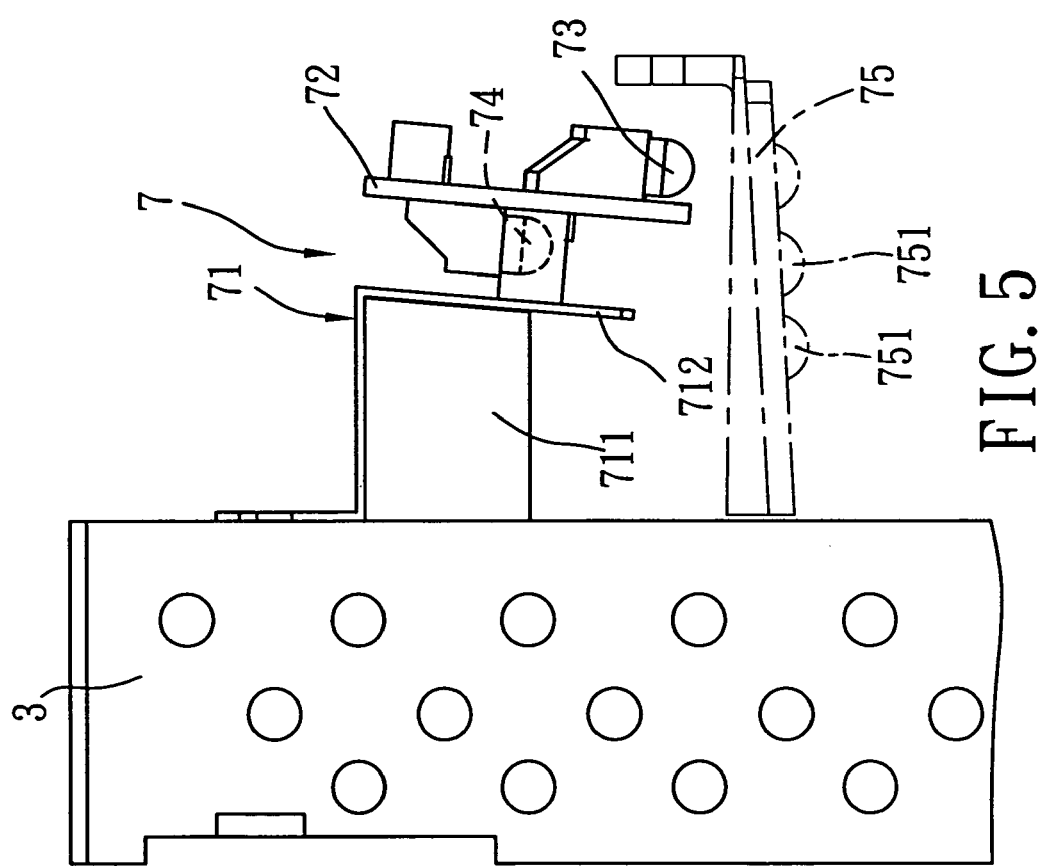
FIG. 5 is a fragmentary schematic view of the preferred embodiment illustrating a third light-emitting unit of a light source.

With further reference to FIG. 5, the light source further includes a third light-emitting unit 7 disposed adjacent to the tag 8 and the terminal module 4. In this embodiment, the third light-emitting unit 7 includes a mounting seat 71, an auxiliary circuit board 72, and first and second sets of lamps 73, 74. The mounting seat 71 of the third light-emitting unit 7 includes a pair of support walls 711 connected transversely to the casing wall 31 of the casing 3, and an inclined wall 712 that is supported by the support walls 711 and that extends inclinedly relative to the casing wall 31 of the casing 3. The auxiliary circuit board 72 of the third light-emitting unit 7 is parallel to and is mounted on the inclined wall 712 of the mounting seat 71 of the third light-emitting unit 7, and has opposite first and second surfaces. The first set of lamps 73 of the third light-emitting unit 7 is mounted on the first surface of the auxiliary circuit board 72 of the third light-emitting unit 7. On the other hand, the second set of lamps 74 of the third light-emitting unit 7 is mounted on the second surface of the auxiliary circuit board 72 of the third light-emitting unit 7. Preferably, each of the lamps 73, 74 of the third light-emitting unit 7 is a light-emitting diode.

The third light-emitting unit 7 further includes a light-diffusing member 75 that serves to diffuse light generated by the lamps 73, 74 of the third light-emitting unit 7. In particular, the light-diffusing member 75 is disposed in front of the lamps 73, 74 of the third light-emitting unit 7, is mounted on the casing wall 31 of the casing 3, and is formed with a plurality of convex light-diffusing projections 751.

It is noted that the light radiated by the lamps 52, 53 of the first light-emitting unit 5, aside from illuminating the input/output terminals 43 of the terminal unit of the terminal module 4, illuminates the indicia 81 on the tag 8 as well. Moreover, the light radiated by the lamps 62 of the second light-emitting unit 6, aside from illuminating the indicia 81 on the tag 8, illuminates the input/output terminals 43 of the terminal unit of the terminal module 4 as well. Further, the lamps 73, 74 of the third light-emitting unit 7 radiate light toward the input/output terminals 43 of the terminal unit of the terminal module 4 and the indicia 81 on the tag 8. As such, since one of the first, second, and third light-emitting units 5, 6, 7 of the light source is sufficient to illuminate both the input/output terminals 43 of the terminal unit of the terminal module 5 and the indicia 81 on the tag 8, two of the first, second, and third light-emitting units 5, 6, 7 of the light source may be dispensed with in other embodiments of this invention.

The display further includes a light switch (not shown) and a timer (not shown). The light switch is coupled to the light source, and is operable so as to turn on/off the lamps 52, 53, 62, 73, 74 of the first, second, third light-emitting units 5, 6, 7 of the light source. The timer is coupled to the light source, and is operable so as to turn off automatically the lamps 52, 53, 62, 73, 74 of the first, second, third light-emitting units 5, 6, 7 of the light source after a predetermined time period.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A display comprising:

a casing including a casing wall;

a terminal module mounted on an exterior of said casing, and including
  an inclined wall that extends inclinedly relative to said casing wall of said casing,
  a main circuit board mounted to said inclined wall, and
  a terminal unit that is mounted on said main circuit board and that extends through said inclined wall; and a light source mounted on one of said casing and said terminal module for illuminating said terminal unit of said terminal module, said light source including a light-emitting unit that includes an auxiliary circuit board mounted on said casing wall of said casing, and a lamp mounted on said auxiliary circuit board.

2. The display as claimed in claim 1, wherein light-emitting unit further includes a light-diffusing member for diffusing light generated by said lamp of said light-emitting unit, said light-diffusing member being mounted on said auxiliary circuit board and being formed with a plurality of light-diffusing projections.

* * * * *